(12) United States Patent
Nakashima et al.

(10) Patent No.: US 8,015,416 B2
(45) Date of Patent: Sep. 6, 2011

(54) MEMORY INFORMATION PROTECTION SYSTEM AND METHODS

(75) Inventors: Takanobu Nakashima, Kyoto (JP); Takashi Oshikiri, Hyogo (JP)

(73) Assignees: Megachips Corporation, Osaka (JP); Nintendo Co., Ltd., Kyoto (JP)

( * ) Notice: Subject to any disclaimer, the term of this patent is extended or adjusted under 35 U.S.C. 154(b) by 1753 days.

(21) Appl. No.: 11/204,362

(22) Filed: Aug. 16, 2005

(65) Prior Publication Data

US 2006/0129845 A1 Jun. 15, 2006

Related U.S. Application Data

(60) Provisional application No. 60/628,924, filed on Nov. 19, 2004.

(30) Foreign Application Priority Data

Nov. 19, 2004 (JP) .................................. 2004-336418

(51) Int. Cl.
*G06F 21/00* (2006.01)
(52) U.S. Cl. ............... 713/191; 380/36; 380/44; 380/45; 380/47
(58) Field of Classification Search .................. 713/193, 713/172, 191
See application file for complete search history.

(56) References Cited

U.S. PATENT DOCUMENTS

| | | | |
|---|---|---|---|
| 5,659,618 A * | 8/1997 | Takahashi et al. ............ | 380/255 |
| 5,802,175 A | 9/1998 | Kara | |
| 5,933,854 A | 8/1999 | Yoshimura | |
| 6,606,707 B1 * | 8/2003 | Hirota et al. ................. | 713/193 |
| 6,848,047 B1 * | 1/2005 | Morikawa et al. ............ | 713/172 |
| 2002/0059518 A1 * | 5/2002 | Smeets et al. ................. | 713/166 |
| 2002/0101996 A1 | 8/2002 | Takada et al. | |
| 2003/0163719 A1 * | 8/2003 | Ebihara ......................... | 713/193 |
| 2004/0255131 A1 * | 12/2004 | Guthery ........................ | 713/189 |

FOREIGN PATENT DOCUMENTS

| | | |
|---|---|---|
| EP | 0 114 522 A | 8/1984 |
| JP | 3-97089 | 4/1991 |
| JP | 7-219852 | 8/1995 |
| JP | 8-328962 | 12/1996 |
| JP | 09-106690 | 4/1997 |
| JP | 2001-35171 | 9/2001 |
| JP | 2003-304237 | 10/2003 |
| WO | WO 01/30020 A1 | 4/2001 |

OTHER PUBLICATIONS

Extended European search report and European search opinion issued in corresponding European patent application (Dec. 16, 2008).
Examination Report for related European Application No. 05772620.0 dated Nov. 9, 2010.
A. Menezes et al., "Handbook of Applied Cryptography", Chapter 5, pp. 169-190, 1996.

* cited by examiner

*Primary Examiner* — Vivek Srivastava
*Assistant Examiner* — Thong Truong
(74) *Attorney, Agent, or Firm* — Nixon & Vanderhye P.C.

(57) ABSTRACT

An information processing apparatus causes an encryption key data generating section to generate key data stored in a semiconductor memory by using encryption key source data read from the semiconductor memory and cipher generation data stored therein, and stores the key data in a temporary storage section. The information processing apparatus transmits data encrypted by an encryption circuit by using the key data. Upon receipt of the encrypted data, the semiconductor memory executes a command decrypted by a decryption circuit similarly using the key data. This achieves data communication only between the predetermined semiconductor memory and the information processing apparatus.

22 Claims, 3 Drawing Sheets

MEMORY INFORMATION PROTECTION SYSTEM AND METHODS

CROSS-REFERENCES TO RELATED APPLICATIONS

This application is a U.S. utility application claiming priority to U.S. Provisional Application No. 60/628,924 filed 19 Nov. 2004 and JP 2004-336418 filed 19 Nov. 2004, the entire contents of each of which are hereby incorporated by reference.

FIELD

The technology herein relates to a technique for ensuring the security of data stored in a semiconductor memory.

BACKGROUND AND SUMMARY

An information processing apparatus has been known which utilizes a software program and data stored in a semiconductor memory by removably connecting the semiconductor memory thereto.

Some of such semiconductor memories have a security technique for the security of data and the like stored therein. For example, Japanese Patent Application Laid-Open No. 9-106690 (1997) and Japanese Patent Application Laid-Open No. 7-219852 (1995) disclose a method of encrypting data by the use of key data. Japanese Patent Application Laid-Open No. 2001-35171 discloses a method which enables data to be inputted and outputted only when an encrypted command is inputted.

However, even if the data is encrypted by utilizing a logical operation such as an exclusive OR by the use of the key data as in Japanese Patent Application Laid-Open No. 9-106690 and Japanese Patent Application Laid-Open No. 7-219852 described above, it is possible to observe the contents of a communication carried out between the semiconductor memory and the information processing apparatus. This presents a problem such that the encrypted data is analyzed.

The strength of security can be improved by complicating an encryption scheme for encryption of a command as in Japanese Patent Application Laid-Open No. 2001-35171 described above. It is, however, difficult to take countermeasures, for example, so as to adopt different encryption techniques for the respective semiconductor memories. Data encrypted by the same encryption technique are always supplied. Further, because the data exchanged between the information processing apparatus and the semiconductor memories are browsable in a similar manner to Japanese Patent Application Laid-Open No. 9-106690 and Japanese Patent Application Laid-Open No. 7-219852 described above, there is a problem such that it is difficult to avoid the possibility that the encrypted data are analyzed.

The technology herein is intended for a memory information protection system comprising an information processing apparatus, and a semiconductor memory removably mounted to the information processing apparatus, the semiconductor memory including a data storage means, a first input/output terminal section, a memory control means, an encryption key source data storage section, and a decryption key data storage means, the information processing apparatus including a processing means, a temporary storage means, a second input/output terminal section, a cipher generation data storage means, an encryption key data generating means, and an encryption means.

The data storage means included in the semiconductor memory stores therein data containing a program to be protected, and is accessed by the information processing apparatus. The first input/output terminal section receives a command including an instruction code and address data from the information processing apparatus, and provides the data read from the data storage means to the information processing apparatus. The encryption key source data storage section stores therein encryption key source data serving as a source for encryption. The decryption key data storage means stores therein decryption key data in a form inaccessible from the information processing apparatus, the decryption key data being a decryption key used to judge that the semiconductor memory is permitted to be used for the information processing apparatus. The memory control means includes a decryption means for decrypting an encrypted command provided from the information processing apparatus by using the decryption key data.

The second input/output terminal section included in the information processing apparatus is connected to the first input/output terminal section of the semiconductor memory, outputs the command including the instruction code and the address data, and receives the data read from the semiconductor memory. The processing means processes the data read from the semiconductor memory, and generates the command to be provided to the semiconductor memory. The cipher generation data storage means stores therein cipher generation data for generation of encryption key data associated with the decryption key data. The encryption key data generating means generates the encryption key data based on the encryption key source data read from the encryption key source data storage section and the cipher generation data. The temporary storage means temporarily stores therein the encryption key data generated by the encryption key data generating means. The encryption means generates the encrypted command obtained by encrypting the command generated by the processing means by using the encryption key data to output the encrypted command to the second input/output terminal section.

The memory control means controls the reading of the data stored in the data storage means by using the command decrypted by the decryption means.

According to the technology herein, the information processing apparatus communicates with the semiconductor memory by using the encryption key data generated in accordance with the information read from the semiconductor memory. This provides the memory information protection system, the method of protecting the memory information, and the semiconductor memory which make it difficult to analyze a security system, thereby effectively preventing the unauthorized reading of data, as compared with an instance in which the same encryption key data is always used and an instance in which encryption key data information itself is transmitted and received between the information processing apparatus and the semiconductor memory.

Preferably, the encryption key data generating means generates the encryption key data having a predetermined relationship with the decryption key data by using the encryption key source data and based on the cipher generation data.

The encryption key data is generated in accordance with the encryption key source data. This preclude the encryption key data from being obtained even if the encryption key source data is read.

Preferably, the temporary storage means stores the encryption key data a data length of which is ten or more times greater than that of the encryption key source data.

The information processing apparatus is capable of generating and using the encryption key data having a greater data length while receiving only the encryption key source data with less data size from the semiconductor memory. This makes it difficult to analyze the encryption key data, thereby effectively preventing the unauthorized reading of data.

Preferably, the processing means doubles as the encryption key data generating means and the encryption means. The processing means performs a computing process on the encryption key source data and the cipher generation data to determine the encryption key data, thereby writing the encryption key data into the temporary storage means, and outputs the encrypted command obtained by encrypting the command by using the encryption key data.

The single processing means implements the operations of the encryption key data generating means and the encryption means. This provides the memory information protection system with a simple construction, as compared with an instance in which these means are independent of each other.

Preferably, the cipher generation data storage means is located as a memory space inaccessible from the outside of the information processing apparatus through the second input/output terminal section.

The prevention of the reading of information required for encryption and decryption from outside makes it difficult to analyze the security system.

Preferably, the decryption key data storage means stores the decryption key data pairing up with the encryption key source data serving as a source of the encryption key data and stored in the encryption key source data storage section.

The use of different pairs of encryption key source data and decryption key data for respective semiconductor memories makes it difficult to analyze the encryption key data, as compared with an instance in which the same encryption key data is used for all of the semiconductor memories.

Preferably, the processing means erases the encryption key data stored in the temporary storage means after the encryption means outputs a desired number of encrypted commands.

Erasing the encryption key data after use makes it difficult to analyze the encryption key data.

It is therefore a primary object of the illustrative non-limiting exemplary technology described herein to provide a memory information protection system, a method of protecting memory information and a semiconductor memory which are capable of enhancing the security of data stored in the semiconductor memory to effectively prevent the unauthorized reading of the stored data.

It is another object of the illustrative non-limiting exemplary technology described herein to provide a memory information protection system, a method of protecting memory information and a semiconductor memory which make the external unauthorized reading of data stored in the semiconductor memory difficult without complicating the construction of the semiconductor memory to ensure the protection of the stored data without significantly increasing the costs of the semiconductor memory.

It is still another object of the illustrative non-limiting exemplary technology described herein to provide a memory information protection system, a method of protecting memory information and a semiconductor memory which make it difficult to analyze a security system for the semiconductor memory to strengthen the security of the stored data.

These and other objects, features, aspects and advantages will become more apparent from the following detailed description of exemplary illustrative non-limiting implementations when taken in conjunction with the accompanying drawings.

DETAILED DESCRIPTION

Construction of Memory Information Protection System

Figure 1:
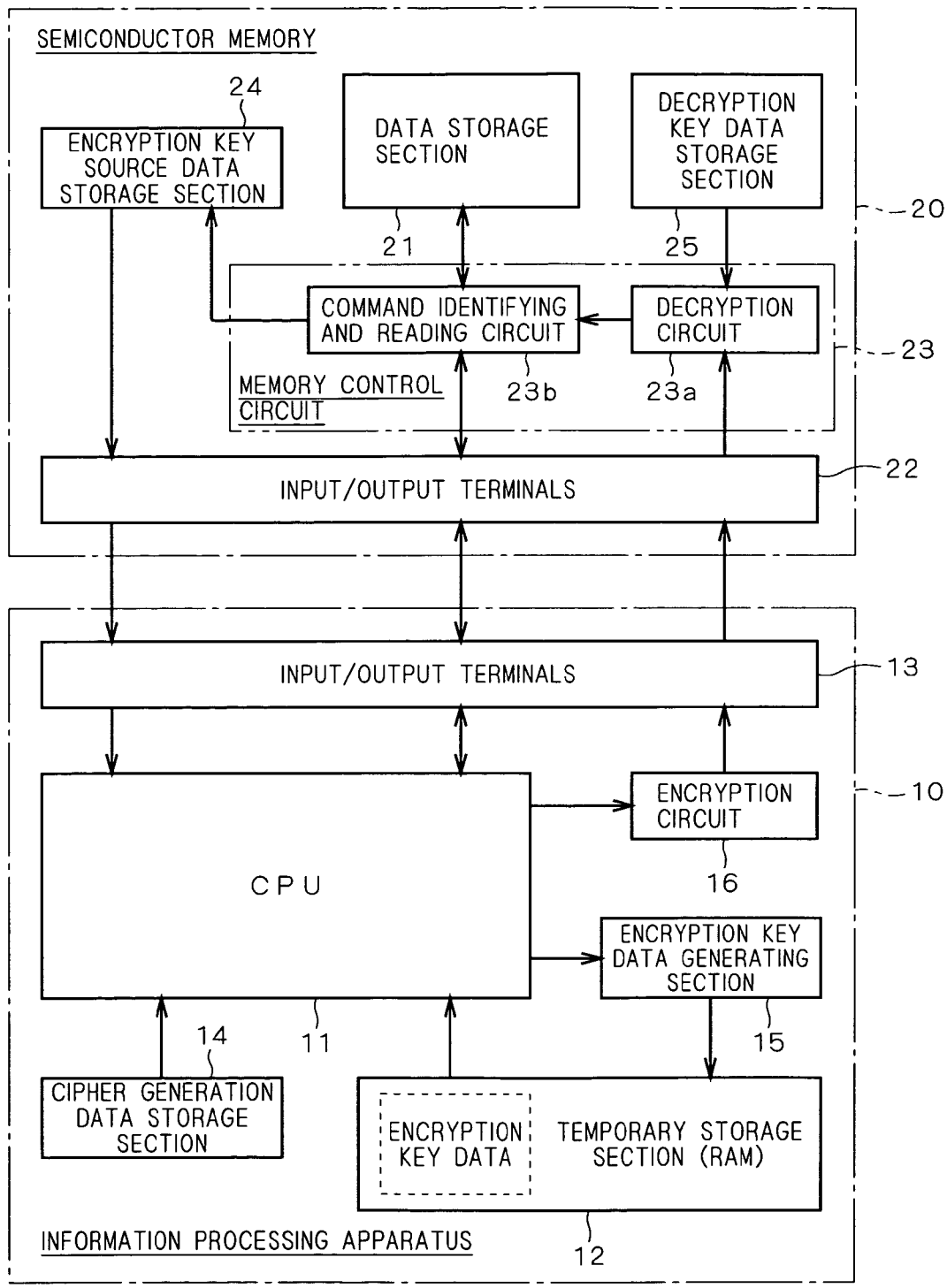
FIG. 1 is a diagram showing an exemplary illustrative non-limiting memory information protection system.

FIG. 1 is a block diagram showing a memory information protection system according to an exemplary illustrative non-limiting implementation. In FIG. 1, the memory information protection system 1 comprises an information processing apparatus 10 and a semiconductor memory 20. First, the outline of the memory information protection system 1 will be described. The memory information protection system 1 is intended for the prevention of the unauthorized reading of memory contents in the semiconductor memory 20 from an apparatus other than the predetermined information processing apparatus 10. To this end, the information processing apparatus 10 generates an encrypted command obtained by encrypting a command including an instruction code and address data to be provided to the semiconductor memory 20 by using encryption key data, to provide the encrypted command to the semiconductor memory 20 when reading the data stored in the semiconductor memory 20. The semiconductor memory 20 decrypts the encrypted command provided from the information processing apparatus 10 by using decryption key data to extract the original command. Only when the command after the decryption is a predetermined command (a read command including a read instruction code and a read address), the data stored in a core memory (a data storage section 21 to be described later) in the semiconductor memory 20 is read out in accordance with a read signal and the read address.

The encryption and decryption involve the need to use key data (for example, common encryption key data and decryption key data) having a predetermined relationship. However, with an arrangement such that the encryption key data is stored in the semiconductor memory 20 and the encryption key data is read from the semiconductor memory 20 and provided to the information processing apparatus 10, the encryption key data will be read in an unauthorized manner and be analyzed. To prevent this, encryption key source data (or encryption key seed data) having a relatively short data length and serving as a source (or a seed) for generating the encryption key data is stored in the semiconductor memory 20 in the memory information protection system 1 according to an exemplary illustrative non-limiting implementation. The encryption key source data is read first, and the information processing apparatus 10 generates the encryption key data having a relatively long data length based on the encryption key source data. Thus, the encryption key source data and the decryption key data are selected to make a pair. At this time, the encryption key data generated by the information processing apparatus 10 is selected so as to be in a predetermined relationship with, e.g. identical with, the decryption key data.

The semiconductor memory 20 stores a software program and data as data whose security is to be ensured in the memory core (the data storage section 21 of FIG. 1) corresponding to a conventional general-purpose mask ROM. This semiconductor memory 20 is, for example, in the form of a card or a cartridge, and is removably mounted to the information processing apparatus 10. The information processing apparatus 10 for the use of the software program and data stored in this semiconductor memory 20 includes a personal computer, a hand-held terminal apparatus such as a PDA (Personal Digital Assistant), and an image processing apparatus. Additionally, the information processing apparatus 10 is applicable to a variety of game apparatuses including a video game machine, a hand-held game machine and the like when the program stored in the semiconductor memory 20 is a game program. Next, the details an exemplary illustrative non-limiting implementation will be described.

Semiconductor Memory

The semiconductor memory 20 includes a memory control circuit 23 provided between the data storage section (or the core memory) 21 and input/output terminals 22. The semiconductor memory 20 further includes an encryption key source data storage section 24 and a decryption key data storage section 25 as inherent components in this exemplary illustrative non-limiting implementation. The data storage section 21 and the input/output terminals 22 are similar to those of a conventionally known general-purpose memory. The data storage section 21 is a nonvolatile memory such as a mask ROM, and stores therein a program, data and the like whose security is to be ensured or which are to be protected from unauthorized reading. The data storage section 21 is not limited to the mask ROM, but may include a flash memory, an EPROM, and the like. The data storage section 21 is accessible from the information processing apparatus 10 through the memory control circuit 23 (that is, a command identifying and reading circuit 23b). The input/output terminals 22 are terminals for electrical connection to input/output terminals 13 in the information processing apparatus 10, and are capable of transferring data between the semiconductor memory 20 and the information processing apparatus 10. The input/output terminals 22 may include command input terminals and data output terminals or may include a plurality of common terminals (for example, eight bits) used for both command input and data output in a time-sharing manner.

The memory control circuit 23 includes a decryption circuit (decryption means) 23a and the command identifying and reading circuit 23b. The decryption circuit 23a decrypts an encrypted command provided from the information processing apparatus 10 by using the decryption key data stored in the decryption key data storage section 25 to be described later. A specific circuit configuration of the decryption circuit 23a is such that a circuit for performing a bit operation on one unit of data (for example, one byte or a predetermined number of bytes) is used to perform a computing process (decryption process) which is the reverse of encryption. An example of the circuit for performing the bit operation includes a circuit for performing logical operations on one unit of data (for example, one byte or a predetermined number of bytes) in a plurality of steps by the use of logic circuits (AND, OR, NAND, exclusive OR and the like). Another example may be a command decryption circuit which performs a simple decryption algorithm computation by the use of a small-scale CPU such as a single-chip microcomputer. The command decrypted by the decryption circuit 23a is inputted to the command identifying and reading circuit 23b and is then executed therein.

The command identifying and reading circuit 23b has the function of identifying the decrypted command to perform an operation depending on the type of the command. Specifically, when the command provided from the information processing apparatus 10 and decrypted by the decryption circuit 23a is the read command for the encryption key source data, the command identifying and reading circuit 23b outputs the read signal and the read address assigned to the storage section 24 to the encryption key source data storage section 24 to cause the storage section 24 to read out the encryption key source data therefrom. When the command provided from the decryption circuit 23a is the read command for the data storage section 21, the command identifying and reading circuit 23b extracts the read instruction code and read address data from the read command to provide the read signal and the read address data to the data storage section 21, thereby reading out data stored in the data storage section 21. Further, when the data storage section 21 is a memory capable of writing and reading (for example, a flash memory) and the command provided from the decryption circuit 23a is a write command for the data storage section 21, the command identifying and reading circuit 23b extracts a write instruction code and write address data from the write command to provide a write signal and the write address data to the data storage section 21, and thereafter writes to-be-written data provided from the information processing apparatus 10 into the data storage section 21. In this case, the command identifying and reading circuit 23b functions as a command identifying and writing circuit.

The encryption key source data storage section 24 is a storage section for storing the encryption key source data serving as the source (or seed) for generation of the encryption key data for use in encryption of the command by the information processing apparatus 10. The encryption key source data storage section 24 stores data having a relatively short data length (for example, several bytes to tens of bytes). A memory space directly accessible from the information processing apparatus 10 which is external equipment from the standpoint of the semiconductor memory 20 is assigned to this encryption key source data storage section 24.

The decryption key data storage section 25 stores therein the decryption key data for use in obtaining an original command by decrypting the encrypted command provided (or inputted) from the information processing apparatus 10 for the reading of the data stored in the semiconductor memory 20. This decryption key data storage section 25 is assigned to a memory space directly inaccessible from outside, and constructed to be readable only by the decryption circuit 23a. The decryption key data stored in the decryption key data storage section 25 is data paired with the encryption key source data stored in the encryption key source data storage section 24, and is selected so that the data length thereof is ten or more times greater than that of the encryption key source data. The reason is to preclude the encrypted command provided from the information processing apparatus 10 from being decrypted without the use of the decryption key data determined to be paired with the encryption key source data, thereby ensuring the security of the data storage section 21 and increasing the strength of the security. The reason why the data length of the decryption key data is selected so as to be greater than the data length of the encryption key source data is that, in general, a greater key data length can provide a greater security strength. On the other hand, if the encryption key source data is increased in data length and is used directly as the encryption key data, the encryption key data can be taken from the outside of the semiconductor memory 20 in an unauthorized manner. This results in the decrease in security strength. For this reason, the encryption key source data stored in the semiconductor memory 20 is the data having a short data length (word length) and serving as the source or seed for generation of the encryption key data, whereby it is difficult to generate the encryption key data even if the encryption key source data is analyzed.

Although the circuit sections contained in the semiconductor memory 20 are illustrated as integrated on a single-chip memory in the above description, the technical concept of the exemplary non-limiting implementation is not limited to such a preferred implementation. The data storage section 21 may be constructed using a general-purpose mask ROM or the like, and other circuit sections may be constructed using a different circuit component. Even in such a case, the security of the data stored in the data storage section 21 is ensured because of the use of the encrypted command.

The encryption key source data for storage in the encryption key source data storage section 24 can be changed in the stage of fabrication of the semiconductor memory 20. Changing the encryption key source data leads to changing the decryption key data. Thus, the use of different encryption key source data and decryption key data, for example, for the respective types of the programs, data and the like stored in the data storage section 21 makes it difficult for a third party to analyze the command obtained by observing the exchange of data between the semiconductor memory 20 and the information processing apparatus 10 because of a change in data about the key pair of encryption key source data and decryption key data. This further improves the security strength of the semiconductor memory 20.

The semiconductor memory 20 does not need complicated construction and processing different from those of conventional products in order to implement various functions and operations described in this exemplary illustrative non-limiting implementation. This avoids a significant increase in costs, as compared with an instance in which a CPU is used as a processing means, and the conventional products.

Information Processing Apparatus

The information processing apparatus 10 includes a CPU 11 which is an example of processing means. A temporary storage section 12 and input/output terminals 13 are connected to the CPU 11. A cipher generation data storage section 14, an encryption key data generating section 15 and an encryption circuit 16 which are inherent circuit components in this exemplary illustrative non-limiting implementation are also connected to the CPU 11. The temporary storage section 12 employs a memory capable of writing and reading data, for example, a semiconductor memory such as a RAM, a hard disk or the like. This temporary storage section 12 includes a storage region for storing the encryption key source data read from the semiconductor memory 20, a storage region for storing the encryption key data generated using the encryption key source data, a read data storage region for storing data (e.g., block-by-block data) read from the data storage section 21 of the semiconductor memory 20, and a storage region for other working data. The storage regions of the temporary storage section 12 are assigned to respective memory spaces which are data-readable from the outside of the information processing apparatus 10.

The input/output terminals 13 are connection terminals or connectors for electrical connection to the input/output terminals 22 of the semiconductor memory 20, and are selected so as to be equal in number to the input/output terminals 22 and to be identical in pin arrangement (or pin-to-pin spacing) with the input/output terminals 22. Address buses and data buses of the CPU 11 are connected to the input/output terminals 13, and command buses of the encryption circuit 16 are connected in parallel to the input/output terminals 13. Preferably, the input/output terminals 13 may include terminals for a predetermined number of bits to use the address buses, the data buses and the command buses in a time-sharing manner for the purpose of reducing the number of terminals by the use of common buses serving as both the address buses, and the data buses and/or the command buses.

The cipher generation data storage section 14 stores therein the cipher generation data for generation of the encryption key data by the use of the encryption key source data read from the encryption key source data storage section 24 of the semiconductor memory 20. The cipher generation data storage section 14 is assigned to a memory space inaccessible from the outside of the information processing apparatus 10. The encryption key data generating section 15 performs a predetermined computation process using the encryption key source data stored in the temporary storage section 12 and the cipher generation data stored in the cipher generation data storage section 14 to generate the encryption key data. The encryption key data generating section 15 then writes the encryption key data into the encryption key data storage region of the temporary storage section 12. Thus, the encryption key data greater in data length than the encryption key source data is generated in the information processing apparatus 10 and is stored in the temporary storage section 12. This makes it difficult to analyze the encryption key data, as compared with an instance in which the encryption key data is stored in the semiconductor memory 20. The encryption key data generated by the encryption key data generating section 15 is data having a predetermined relationship with (for example, the same as) the decryption key data in the semiconductor memory 20, and serves as a kind of common key.

As long as there is a need for the CPU 11 to generate a command by executing the computation process to read the data stored in the semiconductor memory 20, the encryption key data generated as mentioned above is stored and held in the predetermined storage region of the temporary storage section 12, but may be erased as appropriate, for example, when command output is suspended or stopped. Erasing the encryption key data at an appropriate time reduces the risk of the reading of the encryption key data from the outside of the information processing apparatus 10. As an example, the data is read in one or more blocks as a reasonable unit from the data storage section 21 and stored in the temporary storage section 12. Then, if the semiconductor memory 20 is not accessed during the processing of data in the one or more blocks, the encryption key data may be erased during the above-mentioned time. If the data in the semiconductor memory 20 is read again after the completion of the program processing for the block, the encryption key data may be generated again using the encryption key source data previously read. Thus, the reduction in time period during which the encryption key data is stored in the temporary storage section 12 prevents the unauthorized reading of the encryption key data.

The encryption circuit 16 performs a predetermined computation process on a command outputted from the CPU 11 and to be provided to the semiconductor memory 20 by utilizing the encryption key data read from the temporary storage section 12, thereby to generate an encrypted command. The encrypted command contains an instruction code and address data, and one command is composed of a plurality of bytes. The encrypted command encrypted by the encryption circuit 16 is provided through the input/output terminals 13 and the input/output terminals 22 in the semiconductor memory 20 to the decryption circuit 23a. That is, the encryption circuit 16 of the information processing apparatus 10 and the decryption circuit 23a in the semiconductor memory 20 are in a corresponding relationship. The command encrypted by the encryption circuit 16 is decrypted by the decryption circuit 23a by using the same key data.

In other words, the encryption key data generating section 15 may be considered to perform the first stage of the encryption process on the cipher generation data by using the encryption key source data to produce the encryption key data, and the encryption circuit 16 may be considered to perform the second stage of the encryption process for encrypting a command by using the encryption key data.

In the above-mentioned exemplary illustrative non-limiting implementation, the encryption key data generating section 15 and the encryption circuit 16 are illustrated as constructed in the form of hardware circuits. However, the processing or functions of the encryption key data generating section 15 and the encryption circuit 16 may be implemented by a program, and the CPU 11 may process the program to effect the software processes of generating the encryption key data and encrypting the command.

As described above, the information processing apparatus 10 does not have the encryption key data in a fixed manner, but generates the encryption key data by using the encryption key source data (or the encryption key seed data) having a short data length and read from the semiconductor memory 20. This makes it difficult to read and hence analyze the encryption key data from outside, consequently ensuring the security of the data stored in the semiconductor memory 20. Additionally, the data for use in generation of the encryption key data is stored in the cipher generation data storage section 14 inaccessible from outside. Therefore, it is impossible to generate the encryption key data even if the encryption key source data is obtained. This assures the confidentiality of the data stored in the semiconductor memory 20.

Operation of Memory Information Protection System

Figure 2:
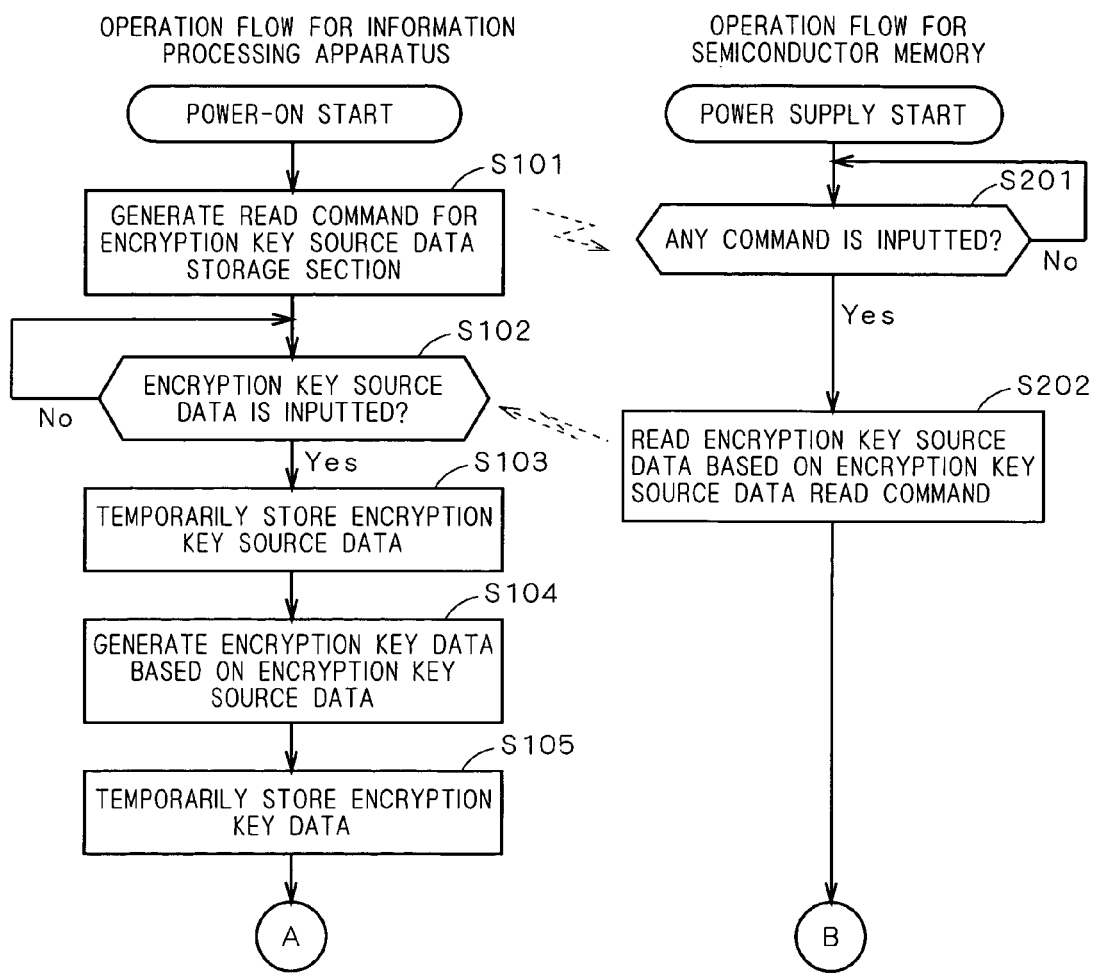
FIG. 2 is a flow chart showing the operation of an exemplary illustrative non-limiting memory information protection system.
Figure 3:
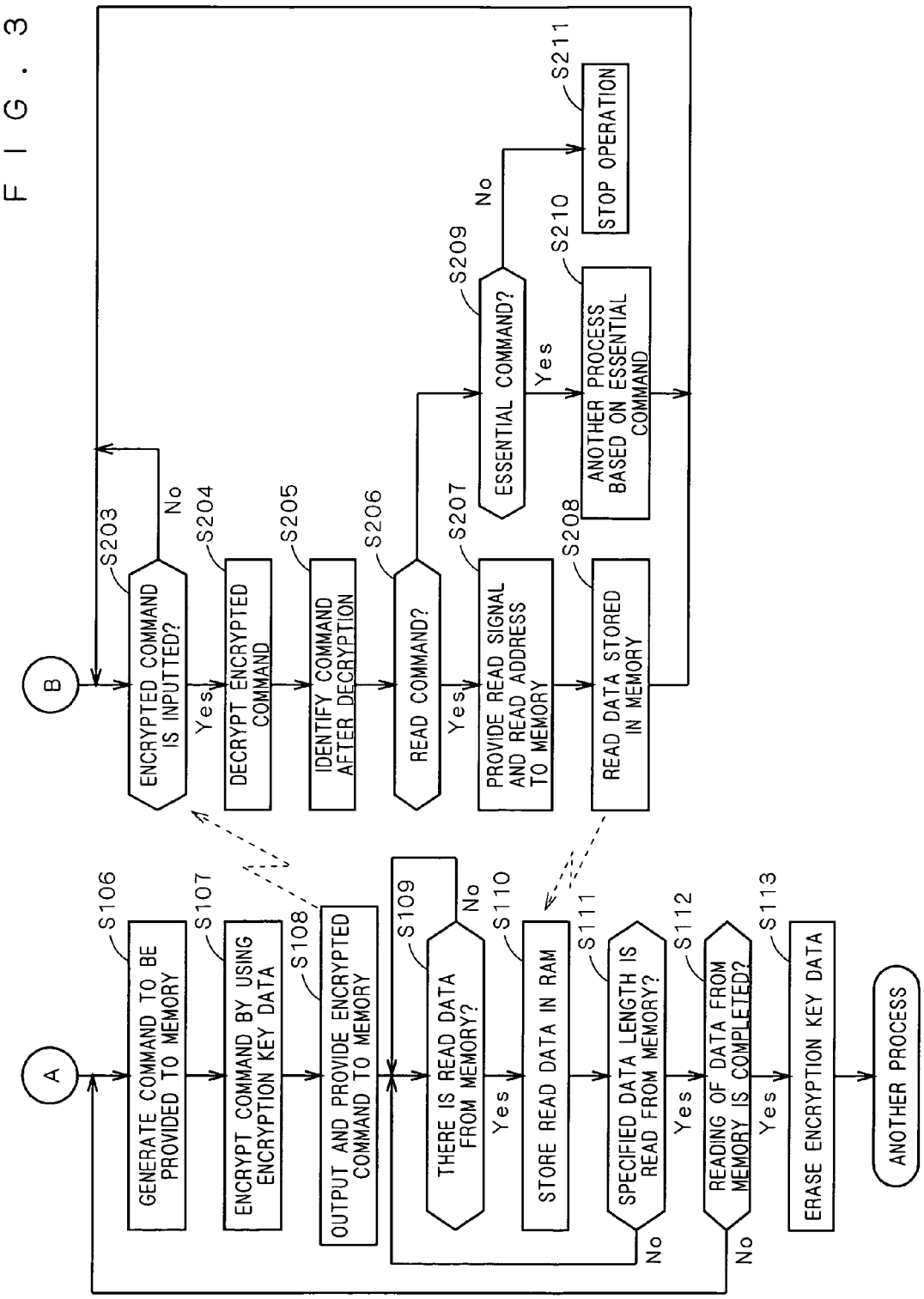
FIG. 3 is a flow chart showing the operation of an exemplary illustrative non-limiting memory information protection system.

FIGS. 2 and 3 are flow charts for illustrating the operation of the memory information protection system 1. The flow charts of FIGS. 2 and 3 show a flow of the operation of the information processing apparatus 10 (Steps 101 to 113) on the left-hand side and a flow of the operation of the semiconductor memory 20 (Steps 201 to 211) on the right-hand side.

It is, however, pointed out that, although the semiconductor memory 20 does not include the processing means such as the CPU but is the operation of hardware circuits, the semiconductor memory 20 is shown using a flow for purpose of convenience in corresponding relation to the flow of the operation of the information processing apparatus 10.

Specific operation of the memory information protection system 1 will be described with reference to FIGS. 1 to 3.

The semiconductor memory 20 is previously mounted to the information processing apparatus 10, and the input/output terminals 13 and the input/output terminals 22 are electrically connected to each other. When the power of the information processing apparatus 10 is turned on, the information processing apparatus 10 starts up, and power is provided to the semiconductor memory 20 to start the operation as the system.

First, in Step (abbreviated as "S" in FIG. 2) 101, the CPU 11 generates the read command (the command containing the read instruction code and the read address data) for the encryption key source data storage section 24 to provide the read command to the semiconductor memory 20. The read command at this time remains unencrypted. In response to this, the command identifying and reading circuit 23b identifies the provided command as the read command for the encryption key source data storage section 24 to provide the read signal and the read address data to the storage section 24 (Step 201). The encryption key source data storage section 24 reads the encryption key source data to provide the encryption key source data to the information processing apparatus 10 (Step 202).

Upon judging that the encryption key source data is inputted in Step 102, the CPU 11 writes the inputted encryption key source data into the encryption key source data storage region of the temporary storage section 12 for temporary storage in Step 103. In Step 104, the CPU 11 performs a computation process to generate the encryption key data, based on the encryption key source data and the cipher generation data stored in the cipher generation data storage section 14. In Step 105, the generated encryption key data is written into the encryption key data storage region of the temporary storage section 12 and temporarily stored therein.

Subsequently, in Step 106, the CPU 11 generates a command to be provided to the semiconductor memory 20. In Step 107, the CPU 11 encrypts the command (also referred to hereinafter as the original command) by using the encryption key data stored in the temporary storage section 12 (or the encryption circuit 16 encrypts the command by using the encryption key data). In Step 108, the encrypted command is outputted and provided to the semiconductor memory 20. Then, the CPU 11 waits until there is data read from the semiconductor memory 20 in Step 109.

The semiconductor memory 20 performs operations to be described below in response to the input of the encrypted command (although decision steps shown in the flow charts are illustrated for purposes of convenience of description, and actually are subjected to hardware processes, rather than software processes). Specifically, in response to the presence of the input of the encrypted command (Step 203), the decryption circuit 23a decrypts the encrypted command by using the decryption key data (Step 204). The command identifying and reading circuit 23b identifies the command after the decryption (Step 205). When the command after the decryption is the read command (Step 206), the command identifying and reading circuit 23b extracts the read instruction code and the read address data from the read command to provide the read signal and the read address data to the data storage section 21 (Step 207). In response to this, the data storage section 21 reads out data stored at the specified read address. The methods of controlling the reading from the data storage section 21 are of two types: a method which provides a read command for each address from the information processing apparatus 10, and a method which provides a read command on a block-by-block basis (for example, for each block number or for block numbers N to M and the like). The reading on the block-by-block basis will be described in this non-limiting implementation. In such a case, a block number (the starting address of the block; a block is specified using a high-order bit) is provided as the read address contained in the read command. Thus, data stored at the addresses of the storage region corresponding to the specified block number are sequentially read from the data storage section 21.

On the other hand, the CPU 11 judges that the read data from the semiconductor memory 20 is present in Step 109, and stores the read data in the temporary storage section 12 in Step 110. Then, a judgment is made in Step 111 as to whether or not the data with a specified data length is read. The processes in Steps 109 to 111 are repeated until the reading of the data with the specified data length is completed. As a result, all of the data specified are read and stored in the temporary storage section 12. Thereafter, a judgment is made in Step 112 as to whether or not the reading of the data from the semiconductor memory 20 is completed, in other words, whether or not the reading of required amounts of data from the memory is completed. If the reading has not yet been completed, the processing returns to Step 109. If the reading has been completed, the processing proceeds to Step 113. In Step 113, the encryption key data stored in the temporary storage section 12 is erased. Thereafter, the CPU 11 performs a process for the purpose of the essential use of the data, based on the data read from the semiconductor memory 20.

If the command is not the read command but a command other than the read command and an essential command related to the memory control (Step 209) as a result of the above-mentioned judgment as to whether or not the command is the read command in the semiconductor memory 20 (Step 206), a process or operation based on the essential command is carried out (Step 210). On the other hand, if the command is not the essential command (Step 209), the operation is stopped (Step 211). Thus, when a command for unauthorized reading and the like is provided, the operation is stopped to inhibit the reading of data from the data storage section 21, whereby the security of the data is insured.

If there arises a need to restart the reading of the data stored in the semiconductor memory 20 again after the erasure of the encryption key data, the processing returns to Step 104 described above. Then, the process of generating the encryption key data is performed, and the subsequent processes are repeated. The process in Step 113 described above may be dispensed with if the risk of the unauthorized reading of the encryption key data is not taken into consideration.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

What is claimed is:

1. A memory information protection system comprising an information processing apparatus, and a semiconductor memory removably mounted to said processing apparatus,
    said semiconductor memory including
       data storage means for storing therein data containing a program to be protected, the data storage means being accessed by said information processing apparatus,
       a first input/output terminal section for receiving a command including an instruction code and address data from said information processing apparatus, and for providing the data read from said data storage means to said information processing apparatus,
       an encryption key source data storage section for storing therein encryption key source data serving as a source for encryption,
       decryption key data storage means for storing therein decryption key data in a form inaccessible from the information processing apparatus, the decryption key data being a decryption key used to judge that said semiconductor memory is permitted to be used for said information processing apparatus, and
       memory control means including a decryption means for decrypting an encrypted command provided from said information processing apparatus by using said decryption key data,
    said information processing apparatus including
       a second input/output terminal section connected to said first input/output terminal section of said semiconductor memory for outputting the command including the instruction code and the address data and for receiving the data read from said semiconductor memory,
       processing means for processing the data read from said semiconductor memory and for generating the command to be provided to said semiconductor memory,
       cipher generation data storage means for storing therein cipher generation data for generation of encryption key data associated with said decryption key data,
       encryption key data generating means for generating said encryption key data based on said encryption key source data read from said encryption key source data storage section and said cipher generation data,
       temporary storage means for temporarily storing therein said encryption key data generated by said encryption key data generating means, and
       encryption means for generating the encrypted command obtained by encrypting the command generated by said processing means by using said encryption key data to output the encrypted command to said second input/output terminal section,
    wherein said memory control means further controls the reading of the data stored in said data storage means by using the command decrypted by said decryption means.

2. The memory information protection system according to claim 1, wherein said encryption key data generating means generates the encryption key data having a predetermined relationship with said decryption key data by using said encryption key source data and based on said cipher generation data.

3. The memory information protection system according to claim 2, wherein said temporary storage means stores the encryption key data a data length of which is ten or more times greater than that of said encryption key source data.

4. The memory information protection system according to claim 2, wherein said processing means doubles as said encryption key data generating means and said encryption means, and wherein said processing means performs a computing process on said encryption key source data and said cipher generation data to determine said encryption key data, thereby writing said encryption key data into said temporary storage means, and outputs the encrypted command obtained by encrypting said command by using said encryption key data.

5. The memory information protection system according to claim 2, wherein said decryption key data storage means stores said decryption key data pairing up with said encryption key source data serving as a source of said encryption key data and stored in said encryption key source data storage section.

6. The memory information protection system according to claim 5, wherein said encryption key source data stored in said encryption key source data storage section and said decryption key data stored in said decryption key data storage means are selected as a different pair of key data depending on the type of the program stored in said data storage means.

7. The memory information protection system according to claim 2, wherein said processing means erases the encryption key data stored in said temporary storage means after said encryption means outputs a desired number of encrypted commands.

8. The memory information protection system according to claim 1, wherein said temporary storage means stores the encryption key data a data length of which is ten or more times greater than that of said encryption key source data.

9. The memory information protection system according to claim 1, wherein said processing means doubles as said encryption key data generating means and said encryption means, and wherein said processing means performs a computing process on said encryption key source data and said cipher generation data to determine said encryption key data, thereby writing said encryption key data into said temporary storage means, and outputs the encrypted command obtained by encrypting said command by using said encryption key data.

10. The memory information protection system according to claim 9, wherein said decryption key data storage means stores said decryption key data pairing up with said encryption key source data serving as a source of said encryption key data and stored in said encryption key source data storage section.

11. The memory information protection system according to claim 1, wherein said cipher generation data storage means is located as a memory space inaccessible from the outside of said information processing apparatus through said second input/output terminal section.

12. The memory information protection system according to claim 11, wherein said decryption key data storage means stores said decryption key data pairing up with said encryption key source data serving as a source of said encryption key data and stored in said encryption key source data storage section.

13. The memory information protection system according to claim 1, wherein said decryption key data storage means stores said decryption key data pairing up with said encryption key source data serving as a source of said encryption key data and stored in said encryption key source data storage section.

14. The memory information protection system according to claim 13, wherein said encryption key source data stored in said encryption key source data storage section and said decryption key data stored in said decryption key data storage means are selected as a different pair of key data depending on the type of the program stored in said data storage means.

15. The memory information protection system according to claim 1, wherein said processing means erases the encryption key data stored in said temporary storage means after said encryption means outputs a desired number of encrypted commands.

16. A method of protecting memory information in an information processing system including an information processing apparatus containing a CPU, and a semiconductor memory removably mounted to said information processing apparatus,
wherein said semiconductor memory includes
data storage means for storing therein data containing a program to be protected,
a first input/output terminal section for receiving a command including an instruction and address data from said information processing apparatus, and for providing the data read from said data storage means to said information processing apparatus,
an encryption key source data storage section for storing therein encryption key source data serving as a source for encryption,
decryption key data storage means for storing therein decryption key data in a form inaccessible from said information processing apparatus, the decryption key data being used to identify that said semiconductor memory is permitted to be used for said information processing apparatus, and
memory control means including a decryption means for decrypting an encrypted command provided from said information processing apparatus by using said decryption key data,
wherein said information processing apparatus includes
a second input/output terminal section connected to said first input/output terminal section of said semiconductor memory for outputting the command including the instruction and the address data and for receiving the data read from said semiconductor memory,
processing means for processing the data read from said semiconductor memory and for generating the command to be provided to said semiconductor memory,
encryption key generation program storage means for storing therein an encryption key data generation program for generation of encryption key data associated with said decryption key data by using said encryption key source data, and
temporary storage means for temporarily storing therein said encryption key data,
wherein said CPU sequentially executes
a first step of generating the encryption key data by using said encryption key source data and based on said encryption key generation program,
a second step of temporarily storing the encryption key data generated in said first step in said temporary storage means, and
a third step of generating the encrypted command obtained by encrypting the command generated by said processing means by using said encryption key data to output the encrypted command to said second input/output terminal section, and
wherein said memory control means sequentially executes
a fourth step of decrypting said command by using said decryption key data, and
a fifth step of providing the address data included in the command to said data storage means to read the data from the data storage means when said command decrypted in said fourth step is a read code.

17. The method of protecting the memory information according to claim 16,
wherein said first step includes the step of generating said encryption key data identical with said decryption key data by using said encryption key source data and based on said encryption key data generation program, and
wherein said third step includes the step of performing encryption by using said encryption key data identical with the decryption key data for use in decryption by said memory control means.

18. A semiconductor memory removably mounted to an information processing apparatus, the information processing apparatus for generating an encrypted command including an instruction code and address data by using encryption key data, the semiconductor memory comprising
data storage means assigned to a memory space accessible by said information processing apparatus for storing therein data containing a program to be protected,
decryption key data storage means assigned to a memory space inaccessible by said information processing apparatus for storing therein decryption key data required for decryption of the encrypted command provided from said information processing apparatus,
an encryption key source data storage section assigned to a space accessible by said information processing apparatus for storing therein encryption key source data associated with said decryption key data and used for said information processing apparatus to generate the encryption key data,
decryption means for decrypting said encrypted command provided from said information processing apparatus by using said decryption key data, and
reading means for providing a read signal to said data storage means and providing the address data included in the command as a read address to said data storage means to thereby control the reading of the data stored in said data storage means when the instruction code included in the command decrypted by said decryption means is judged as a read instruction code.

19. The semiconductor memory according to claim 18, wherein the encryption key source data stored in said encryption key source data storage section and said decryption key data stored in said decryption key data storage means are selected as a different pair depending on the type of said program stored in said data storage means.

20. The semiconductor memory according to claim 18, wherein the decryption key data stored in said decryption key data storage means is selected to have a data length which is ten or more times greater than that of said encryption key source data.

21. A memory information protection system comprising an information processing apparatus, and a semiconductor memory removably mounted to the processing apparatus,
the semiconductor memory including
data storage circuitry for storing therein data containing a program to be protected, the data storage circuitry being accessed by the information processing apparatus,
first input/output terminal circuitry for receiving a command including an instruction code and address data from the information processing apparatus, and for providing the data read from the data storage circuitry to the information processing apparatus,
encryption key source data storage circuitry for storing therein encryption key source data serving as a source for encryption,
decryption key data storage circuitry for storing therein decryption key data in a form inaccessible from the information processing apparatus, the decryption key data being a decryption key used to judge that the semiconductor memory is permitted to be used for the information processing apparatus, and
a memory controller including a decrypting section structured to decrypt an encrypted command provided from the information processing apparatus by using the decryption key data,
the information processing apparatus including
second input/output terminal circuitry connected to the first input/output terminal section of the semiconductor memory for outputting the command including the instruction code and the address data and for receiving the data read from the semiconductor memory,
a processor for processing the data read from the semiconductor memory and for generating the command to be provided to the semiconductor memory,
cipher generation data storage circuitry for storing therein cipher generation data for generation of encryption key data associated with the decryption key data,
encryption key data generating circuitry for generating the encryption key data based on the encryption key source data read from the encryption key source data storage section and the cipher generation data,
temporary storage circuitry for temporarily storing therein the encryption key data generated by the encryption key data generating circuitry, and
encryption circuitry for generating the encrypted command obtained by encrypting the command generated by the processor by using the encryption key data to output the encrypted command to the second input/output terminal circuitry,
wherein the memory controller further controls the reading of the data stored in the data storage circuitry by using the command decrypted by the decryption circuitry.

22. A method of protecting memory information in an information processing system including an information processing apparatus containing a CPU, and a semiconductor memory removably mounted to the information processing apparatus,
wherein the semiconductor memory includes
data storage circuitry configured to store therein data containing a program to be protected,
first input/output terminal configured to receive a command including an instruction and address data from the information processing apparatus, and to provide the data read from the data storage circuitry to the information processing apparatus,
encryption key source data storage circuitry configured to store therein encryption key source data serving as a source for encryption,
decryption key data storage circuitry configured to store therein decryption key data in a form inaccessible from the information processing apparatus, the decryption key data being used to identify that the semiconductor memory is permitted to be used for the information processing apparatus, and
a memory controller including decryption circuitry configured to decrypt an encrypted command provided from the information processing apparatus by using the decryption key data,
wherein the information processing apparatus includes
second input/output terminal circuitry connected to the first input/output terminal circuitry of the semiconductor memory for outputting the command including the instruction and the address data and for receiving the data read from the semiconductor memory,
a processor configured to process the data read from the semiconductor memory and to generate the command to be provided to the semiconductor memory,
encryption key generation program storage circuitry configured to store therein an encryption key data generation program for generation of encryption key data associated with the decryption key data by using the encryption key source data, and
temporary storage circuitry configured to temporarily store therein the encryption key data,
wherein the CPU sequentially executes
generating the encryption key data by using the encryption key source data and based on the encryption key generation program,
temporarily storing the generated encryption key data in the temporary storage circuitry, and
generating the encrypted command obtained by encrypting the command generated by the processor by using the encryption key data to output the encrypted command to the second input/output terminal circuitry, and
wherein the memory controller sequentially executes
decrypting the command by using the decryption key data, and
providing the address data included in the command to the data storage circuitry to read the data from the data storage circuitry when the decrypted command is a read code.

* * * * *